United States Patent [19]

Anderson et al.

[11] 4,393,433

[45] Jul. 12, 1983

[54] OVERVOLTAGE PROTECTOR FOR TELEPHONE LINES

[75] Inventors: James E. Anderson, Almonte; John D. Lee, Manotick; Frederick C. Livermore, Stittsville, all of Canada

[73] Assignee: Northern Telecom Limited, Montreal, Canada

[21] Appl. No.: 284,005

[22] Filed: Jul. 16, 1981

[51] Int. Cl.$^{3}$ .............................................. H02H 9/06

[52] U.S. Cl. .................................... 361/119; 313/325; 313/231.11; 361/120; 361/129

[58] Field of Search ............... 361/119, 120, 118, 117, 361/129, 124; 313/325, 231.1, 291, 355, 217, 214; 315/36

[56] References Cited

U.S. PATENT DOCUMENTS

| | | | |
|---|---|---|---|
| 2,688,105 | 8/1954 | Hasselhorn | 313/325 X |
| 2,907,910 | 10/1959 | Marsteller | 361/129 X |
| 3,594,603 | 7/1971 | Guckenburg | 313/325 X |
| 3,923,849 | 2/1960 | Rees | 361/119 X |
| 4,129,894 | 12/1978 | Chen | 313/325 X |

*Primary Examiner*—Patrick R. Salce
*Attorney, Agent, or Firm*—S. T. Jelly

[57] ABSTRACT

An overvoltage or surge protector, particularly for telephone lines, has two electrodes in opposition in a housing. The gap between the inner ends of the electrodes is set by a layer of dielectric material on the center portion of one or both end surfaces of the electrodes. Breakdown occurs with assistance from dielectric stimulation of the arc, resulting from an electrical field across the dielectric. The center portions are surrounded by annular grooves, which are also covered with a dielectric layer. The end surfaces external to the center portions can be convex, and also roughened.

18 Claims, 4 Drawing Figures

OVERVOLTAGE PROTECTOR FOR TELEPHONE LINES

This invention relates to overvoltage or surge protectors for telephone lines.

Various forms exist, the intent of use being particularly to protect telecommunications apparatus from external voltage surges such as result from lightning strikes and accidental contact with power lines. Basically a protector comprises two electrodes with a predetermined gap between them. The gap sets the breakdown voltage. Carbon block electrodes are an early form, still in use, but their life is relatively short as shorting between the blocks occurs after a relatively few surges. Metal electrodes have also been used, but have the same problem.

A type of protector having a longer life is a gas tube protector. In such devices two spaced electrodes are in a sealed chamber. The internal pressure is sub-atmospheric and on breakage of the seal, bringing the pressure to ambient, the devices are no longer satisfactory. The large gap causes the breakdown voltage to become too high at ambient pressures.

The present invention provides a protector which has a predetermined gap which can very accurately be set, can be at ambient pressure and also has a reasonable life. Particularly, the protector has a very high effectiveness for impulse breakdown. In conventional protectors, the impulse breakdown is generally considerably higher than the normal DC breakdown. In the present invention, the protector has two electrodes in opposition, the gap being set by a dielectric layer, the electrodes in contact at the dielectric layer. The gap is external to the dielectric layer, being set by the thickness of the layer. Breakdown occurs at the gap, the breakdown being assisted by dielectric stimulated arcing, resulting from an electrical field set up across the dielectric. An annular groove surrounds the electrode contact area, the surfaces of the groove also being coated with a dielectric. To increase the life of the device, the breakdown or emitter surfaces of the gap can be convex to prevent local melting at sharp corners, and the surfaces can be roughened to enhance arc movement. The arc stimulation by the field across the dielectric considerably lowers the impulse breakdown value.

The invention will be readily understood by the following description of certain embodiments, by way of example, in conjunction with the accompanying drawings, in which.

Figure 1:
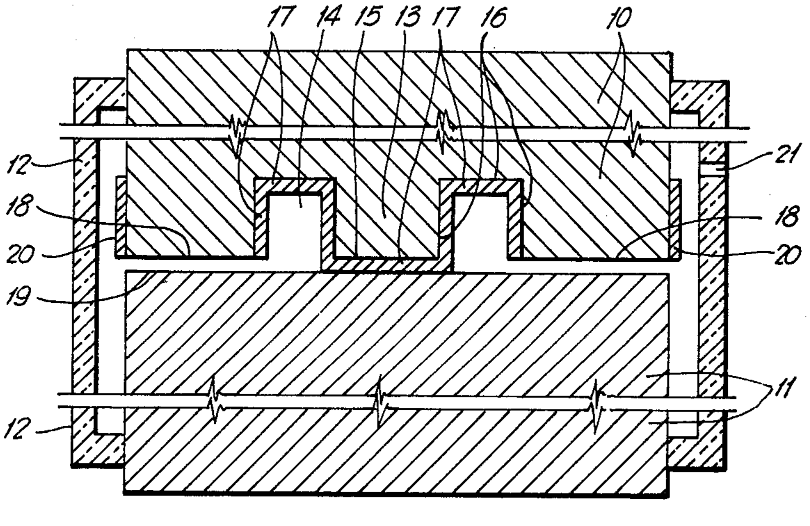
FIG. 1 is a longitudinal cross-section through a protector, illustrating the basic features of the invention.

FIG. 1 illustrates the basic features of the invention. Two electrodes 10 and 11 are in opposition, in a housing 12. On the end surface of electrode 10 there is a central portion 13 surrounded by an annular groove 14. The end surface 15 of the portion 13 and the surfaces 16 of the groove 14 are covered with a dielectric layer 17.

In the example, the thickness of the layer on the end surface 15 sets the gap between the surface 18 of electrode 10 and end surface 19 of electrode 11. The outer periphery of the electrode 10 also has a dielectric layer 20 extending from surface 18 for a short distance. There are thus defined the two opposed arc surfaces 18 and 19, and the breakdown voltage is set in part by this gap. This voltage is also set, or affected, by the field set up across the dielectric layer on the surface 15. The dielectric field results in an effective radiation being ejected laterally between the surfaces 18 and 19. This radiation increases with voltage and becomes a significant part of the breakdown phenomena at the breakdown voltage. The radiation enhances or stimulates the breakdown mechanism by reducing the statistical time lag, which results in low impulse breakdown voltages and a low impulse ratio. The impulse ratio is the ratio between normal DC breakdown and impulse breakdown voltages. As stated previously this ratio is usually well above unity, for example three to five. Ideally a ratio of one is desirable.

The annular groove 14 prevents shorting around the layer on surface 15 and the layer 17 on the surfaces 16 prevents any discharge from these surfaces, restricting arc discharge to the surface 18. The layer on the surfaces 16 of the groove 14 can be of some other form of dielectric layer to that on the central portions but is conveniently formed at the same time the layer on surface 15 is formed.

The material of electrode 10 can vary. Thus pure aluminum, superplastic aluminum alloy and superplastic zinc/aluminum alloy can be used. In a variation, titanium, tantalum, Niobium, Hafnium and Zirconium can be used, for the whole electrode or as a thin layer attached to a main body portion of an electrode.

In the example illustrated, the space within the housing 12 is at ambient pressure. This is obtained by, for example, venting the space via a vent 21 in the housing 12. The housing is conveniently of ceramic. One alternative is to make the housing of porous ceramic, in which case a special vent would not be required. Other materials are glass and plastics. The electrodes are bonded to the housing, or may be a force fit.

Figure 2:
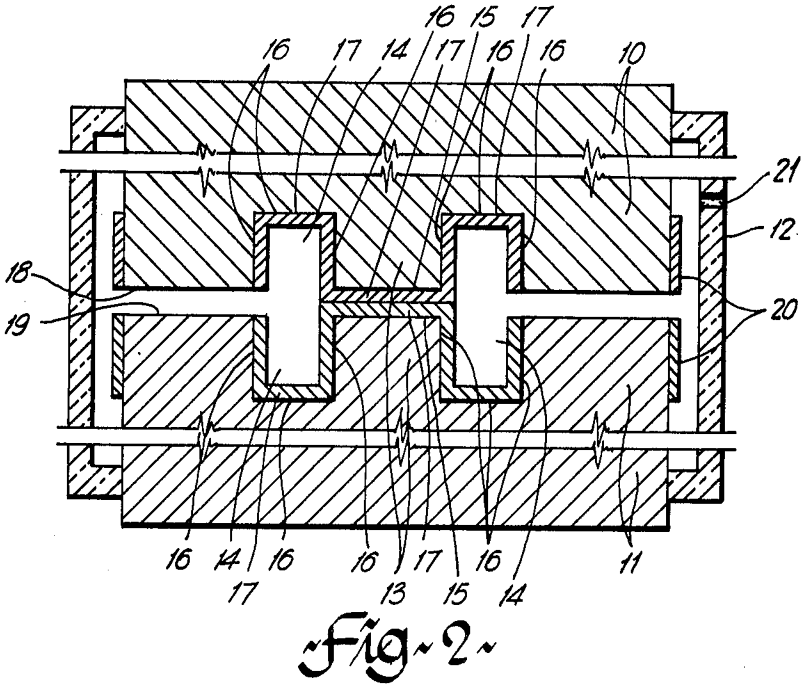
FIG. 2 is a cross-section similar to that of FIG. 1, both electrodes having the basic features.

In FIG. 2, both electrodes 10 and 11 have a central portion 13, grooves 14 and layers 17. In this example the gap between surfaces 18 and 19 is set by the two layers 17 on the central portions 13.

Figure 3:
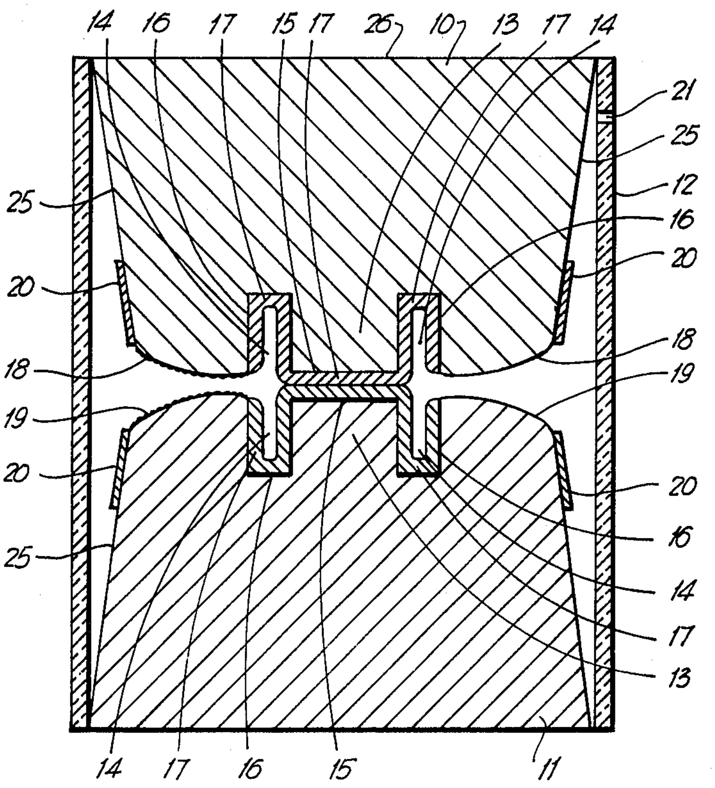
FIG. 3 is a cross section similar to that of FIG. 2, illustrating electrodes with convex arc surfaces, and also illustrating a possible modification of roughened surfaces.

FIG. 3 illustrates a preferred form or embodiment of the invention. In this example, the electrodes 10 and 11 have tapered peripheries 25 and are a press fit in the housing 12. Each electrode has a central portion 13, an annular groove 14, and anodized layer 17. The surfaces 18 and 19 are convex. The curvature of the surfaces 18 and 19 is such as will avoid local melting at corners of the arcing surface. This reduces the chance of shorting across the gap by metal ejected from the surfaces. Radiation is emitted at the air-dielectric interface between layers 17, and stimulates the breakdown mechanism.

A further refinement, or modification, is roughening the surfaces 18 and 19. This enhances arc movement once the breakdown occurs, thus reducing local heating and increases the life of the device. Again the housing is vented, or is of porous or other structure so as to be at ambient pressure within the housing.

Electrical connection is made to the electrodes on their end surfaces 26.

Figure 4:
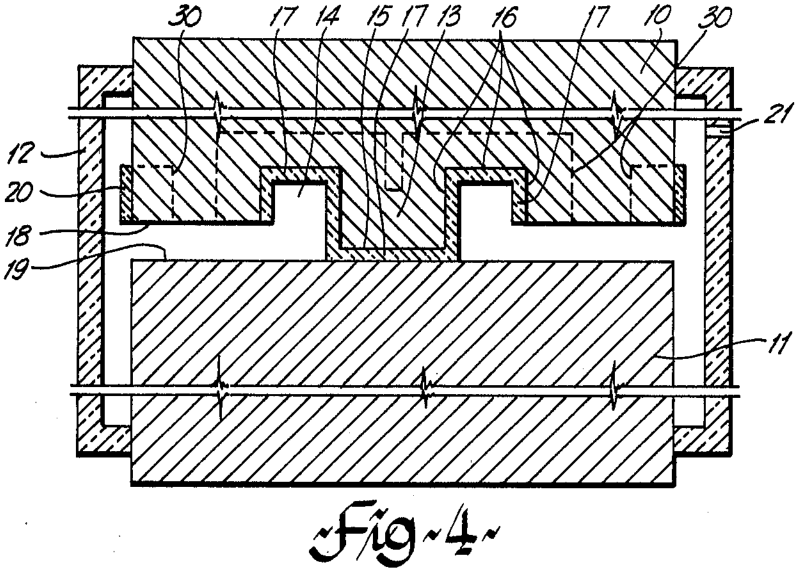
FIG. 4 is a further cross-section, similar to that of FIG. 1, illustrating a further embodiment.

FIG. 4 illustrates an arrangement in which the gap is not directly set by the dielectric layer thickness. The same reference numerals are used for common details, as in FIGS. 1 to 3. The major difference in FIG. 4 is that the gap is primarily set by the center portion 13 being formed to project beyond the surface 18 of electrode 10. A layer of dielectric 17 is also applied, and therefore the gap is set by the center portion 13 plus the thickness of layer 17 on the center portion.

The feature of FIG. 4, that is the projection of the center portion 13, can be applied to both electrodes, for example in the arrangements of FIG. 2 and FIG. 3.

One convenient way of forming the layer 17, and 20, is by anodizing. However, in anodizing the layer "grows" inwards as well as outwards, the inward "growth" being, in fact, more than the outward growth. Thus, in FIG. 4, an anodized layer will be relatively thick and extend into the electrode, as indicated by the dotted lines 30. Anodizing does provide a high degree of control as the layer thickness is generally directly related to time. This can give close control of the layer thickness and thus of the gap.

The dielectric layer can be formed by anodizing: plasma spray; reactive vacuum deposition; sputter coating or evaporation of dielectrics; thick film techniques or other suitable methods. The areas coated can be defined by etch back (chemical; machining; selective ionic bombardment; premasking or coating). The properties of the dielectric layer are a dielectric strength and a thickness greater than breakdown of the gap under all conditions; chemically passive; mechanically rugged; high dielectric constant; provides dielectric stimulation of the arc to the peripheral gap. The electrodes can be of a single metal, of composite or layered structure, provided the "arc" surface is suitable for arcing and the surface at the central portion capable of having a dielectric layer firmly bonded thereto.

The basic feature of the invention is the provision of dielectric interface at which, as a result of an electrical field across the dielectric interface, arc stimulation occurs. It is not necessary that the contacting surfaces be perfectly smooth, only that there is contact between surfaces, even if the surfaces are slightly rough, or irregular, as is likely to occur in normal manufacture.

The invention, as previously stated, is particularly effective with respect to the impulse breakdown voltage, although the invention is also effective for the normal DC breakdown. It is desirable that breakdown should occur as rapidly as possible, to give good impulse breakdown characteristics. The DC breakdown value is obtained by applying a steadily increasing voltage until breakdown occurs. The impulse breakdown value is obtained by applying successively increasing voltages for short periods for example 100 volts per microsecond. Ideally the device should breakdown at the same value as the DC breakdown with a very short pulse.

In some typical values obtained with protectors in accordance with the present invention, with a 0.0005" gap, a DC breakdown of about 400 volts and an impulse breakdown of about 460 volts have been obtained. For a 0.001" gap, breakdown voltages of about 550 and 650 respectively have been obtained, and for a 0.0025" gap values of about 650 volts and 750 volts respectively have been obtained. It will be seen that the impulse breakdown voltages are only slightly higher than the DC breakdown voltages. For a conventional gap of 0.002", the impulse breakdown voltage can be from 1200 volts to 2500 volts, or higher.

While described and illustrated as operating at ambient pressure, it is possible to make the protector as a sealed gas-tube device. In such an arrangement the housing 12 would not be porous, and vents 21 would not be provided. Also, the dielectric layers 20 can be omitted.

What is claimed is:

1. An overvoltage protector comprising:

a tubular housing of dielectric material:

two electrodes in said housing, said electrodes each having an inner end surface, said inner end surfaces being in mutual opposition; said inner end surface of at least one of said electrodes comprising a central portion, an annular groove extending around said central portion, and an outer annular portion extending around said annular groove;

a dielectric layer extending across said central portion and at least partly into said annular groove, said dielectric layer being clamped between the juxtaposed central portions of said electrodes;

means for making electrical connections to said electrodes, wherein said outer annular portion is spaced from the corresponding opposed inner surface of the other of said electrodes to form a spark gap therebetween, said spark gap being substantially aligned laterally with the plane of said dielectric layer.

2. A protector as claimed in claim 1, including a further dielectric layer on the central portion of the inner end surface of said other electrode, said further dielectric layer in contact with that, on said center portion of said one electrode.

3. A protector as claimed in claim 2, each of said inner end surfaces having a convex profile, the gap between said convex profiles increasing in a direction away from said central portions.

4. A protector as claimed in claim 3, said convex surfaces having a roughened finish.

5. A protector as claimed in claim 1, including a layer of dielectric material on the outer peripheral surface of each electrode, extending from said end surface at least part way for the length of the electrode.

6. A protector as claimed in claim 1, said electrodes having outer ends, said outer ends extending from said housing for electrical connection thereto.

7. A protector as claimed in claim 1, said gap being at ambient pressure.

8. A protector as claimed in claim 7, said housing being porous.

9. A protector as claimed in claim 7, including at least one vent in said housing.

10. A protector as claimed in claim 1, said electrodes sealed to said housing, said gap being in a sealed environment.

11. A protector as claimed in claim 1, said center portion having an end surface projecting beyond the remainder of said inner end surface of the electrode.

12. An overvoltage protector for telephone lines, comprising:

a tubular housing of dielectric material;

two electrodes in said housing, said electrodes each having an outer end surface extending from said housing and an inner end surface in opposition;

a dielectric layer on a center portion of each of said inner end surfaces, said dielectric layers in contact, and a gap between the inner end surfaces of said electrodes;

an annular groove extending around each center portion, each groove having inner and outer side surfaces and a bottom surface, and a layer of dielectric material on the side and bottom surfaces;

a layer of dielectric material on the outer peripheral surface of each electrode at an inner end, extending from the inner end surface.

13. A protector as claimed in claim 12, each of said inner end surfaces having a convex profile, the gap between the inner end surfaces increasing in a direction away from said central portions.

14. A protector as claimed in claim 13, each of said inner end surfaces having a roughened finish for said convex profile.

15. A protector as claimed in claim 12, said housing at ambient pressure.

16. A protector as claimed in claim 15, including at least one vent in said housing.

17. A protector as claimed in claim 12, said housing sealed and said gap at a sub-atmospheric pressure.

18. A protector as claimed in claim 12, said layer of dielectric material being an anodized layer.

* * * * *